United States Patent
Nicholas

(10) Patent No.: US 7,331,736 B2
(45) Date of Patent: Feb. 19, 2008

(54) METAL CUTTING TOOL

(75) Inventor: Roger Nicholas, Akron, OH (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/575,390

(22) PCT Filed: Oct. 14, 2004

(86) PCT No.: PCT/US2004/034200

§ 371 (c)(1),
(2), (4) Date: Jan. 18, 2007

(87) PCT Pub. No.: WO2005/037499

PCT Pub. Date: Apr. 28, 2005

(65) Prior Publication Data

US 2007/0110526 A1    May 17, 2007

(51) Int. Cl.
    *B23B 29/14*    (2006.01)
(52) U.S. Cl. ............... 407/110; 407/91; 407/109
(58) Field of Classification Search .......... 407/91, 407/110, 50, 109, 107, 111; 82/158; B23B 29/14
    See application file for complete search history.

(56) References Cited

U.S. PATENT DOCUMENTS

| | | | | |
|---|---|---|---|---|
| 4,801,224 A | * | 1/1989 | Pettersson et al. | 407/110 |
| 5,031,492 A | * | 7/1991 | Zinner | 82/158 |
| 5,079,979 A | * | 1/1992 | Pano | 82/158 |
| 5,360,298 A | * | 11/1994 | Hedlund | 407/110 |
| 6,086,291 A | * | 7/2000 | Hansson et al. | 407/110 |

* cited by examiner

*Primary Examiner*—Monica Carter
*Assistant Examiner*—Sara Addisu
(74) *Attorney, Agent, or Firm*—Tarolli, Sundheim, Covell & Tummino, LLP

(57) ABSTRACT

A cutting tool assembly (14) including a tool holder (20) having a removeable clamp (20a). A cutting insert support blade member (16) is removably held in the tool holder by the clamp (20a). The cutting insert support blade (16) includes at least one, preferably two, insert receiving pockets (30). The pockets (30) are defined by a body portion (16b) and a clamp portion (16a) joined together by an integrally formed resilient or deformable portion (16c) which permits slight resilient movement between the clamping and body portions to facilitate the installation of a cutting insert (18) in a pocket. When the insert support blade (16) is mounted in the tool holder (20), the clamp inserts clamping forces to the clamping portion (16a) of the insert support blade which serves to secure the insert support blade to the tool holder and exert clamping forces on an insert (18) held in the pocket. The integrally formed resilient/deformable portion (16c) includes a plurality of slots (50, 52, 50', 52'), some of which open into an aperture (54) spaced from a pocket (30). The slots enable resilient movement between the clamping and body portions.

17 Claims, 6 Drawing Sheets

METAL CUTTING TOOL

TECHNICAL FIELD

The present invention relates generally to cutting tools and, in particular, to a cutoff tool having a support blade for mounting replaceable cutting inserts.

BACKGROUND ART

Cutoff and grooving systems that can be extended or retracted to a variety of depths of cut are advantageous because of the ability to optimally adjust the tool to the specific requirements of a given job. Cut off tools presently available either utilize a screw to clamp the inserts in place, necessitating a wide toolholder section required to receive the screw or they use a variety of self gripping designs which require unique, specialized tools to lock down and release the cutting insert. Other cutoff tools have utilized cams or screws that pry open the moveable part of the blade and lock down the insert when released. Although standard wrenches will loosen and tighten the screws or cams, the need for extra components and the wear they experience makes them less useful over time.

DISCLOSURE OF INVENTION

The present invention obviates the above identified shortcomings by enabling a cutting insert to be placed in a support/retaining or holding blade simply by having the operator press the insert into a receiving slot or pocket defined by the blade. After use, the insert can be removed by hand as well—eliminating the need for costly and unique tools to assist in the loading/unloading process. The holding blade is, in turn, placed in a toolholder which clamps the blade in place, providing the primary clamping force for the cutting insert.

To install a cutting insert, a machine operator simply places the cutting insert in the tool holding blade; the insertion of the insert pries the clamping portion open, exerting virtually no force. The cutting insert is slid to an abutment or back wall of the receiving slot and the insert is securely held in place by a deformable clamping portion of the support/retaining blade. The blade with insert installed is then placed in a toolholder where it is, in turn, clamped by a screw down clamping device. The clamping device of the tool holder exerts a clamping pressure on the insert via the deformable clamping portion of the support/retaining blade and secures locking of the cutting insert.

In the preferred and illustrated embodiment, a cutting insert support member, which is preferably in the form of a blade, is disclosed that includes a body portion and a clamp portion. The clamp portion is coupled to the body portion by a resilient or deformable coupling region. A cutting insert receiving pocket is defined between the body and clamping portions and includes insert gripping surfaces formed on the body and clamping portion which are movable towards each other in order to clamp a cutting insert in the pocket.

In the illustrated embodiment, the resilient or deformable region includes at least one, but preferably a plurality of relatively thin slots which enable relative movement between the clamping and body portions. In the illustrated embodiment, a pair of insert receiving pockets are defined on opposite ends of the tool support blade. The gripping surfaces are V-shaped.

According to the invention, the resiliently movable or deformable clamp portion is urged into clamping contact with a cutting insert installed in an associated pocket by a clamp forming part of a tool holder. In this preferred embodiment, the clamp forming part of the tool holder not only secures the support blade to the tool holder, but also serves to apply clamping forces to the cutting insert held in the pocket in order to maintain its position.

According to a feature of the invention, the body, clamping and deformable portions are integrally formed from a single piece of material.

A primary objective of the invention is to establish a sufficiently flexible clamping mechanism that will allow the top of the tool holding device to be pried up by placing the cutting insert in the appropriate receiving slot. The insert is set in place by the operator without the need for any assistance tooling. Conversely, the insert can then be removed by simply pulling the insert out of the receiving slot.

A secondary object of the invention is to eliminate the need for additional fasteners, cams, locking and prying devices for loading and removing the cutting insert.

Yet a further object of the invention is to simplify the placement and removal of the cutting insert so that no special skills are required to change worn tools and replace them with new cutting tools.

BEST MODE FOR CARRYING OUT THE INVENTION

Figure 1:
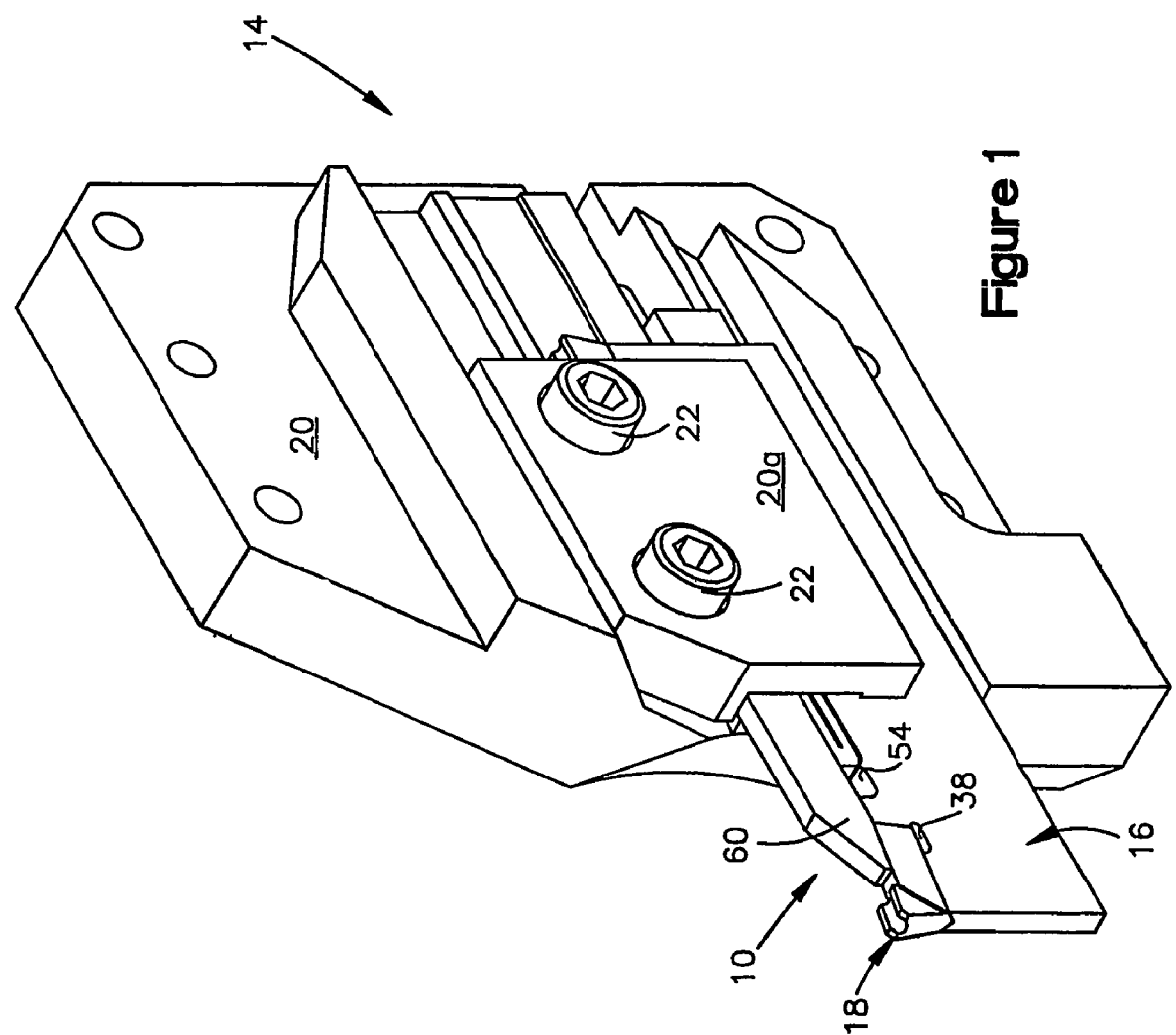
FIG. 1 is a perspective view of a cutoff tool constructed in accordance with the preferred embodiment of the invention being held in a tool holder assembly.
Figure 2:
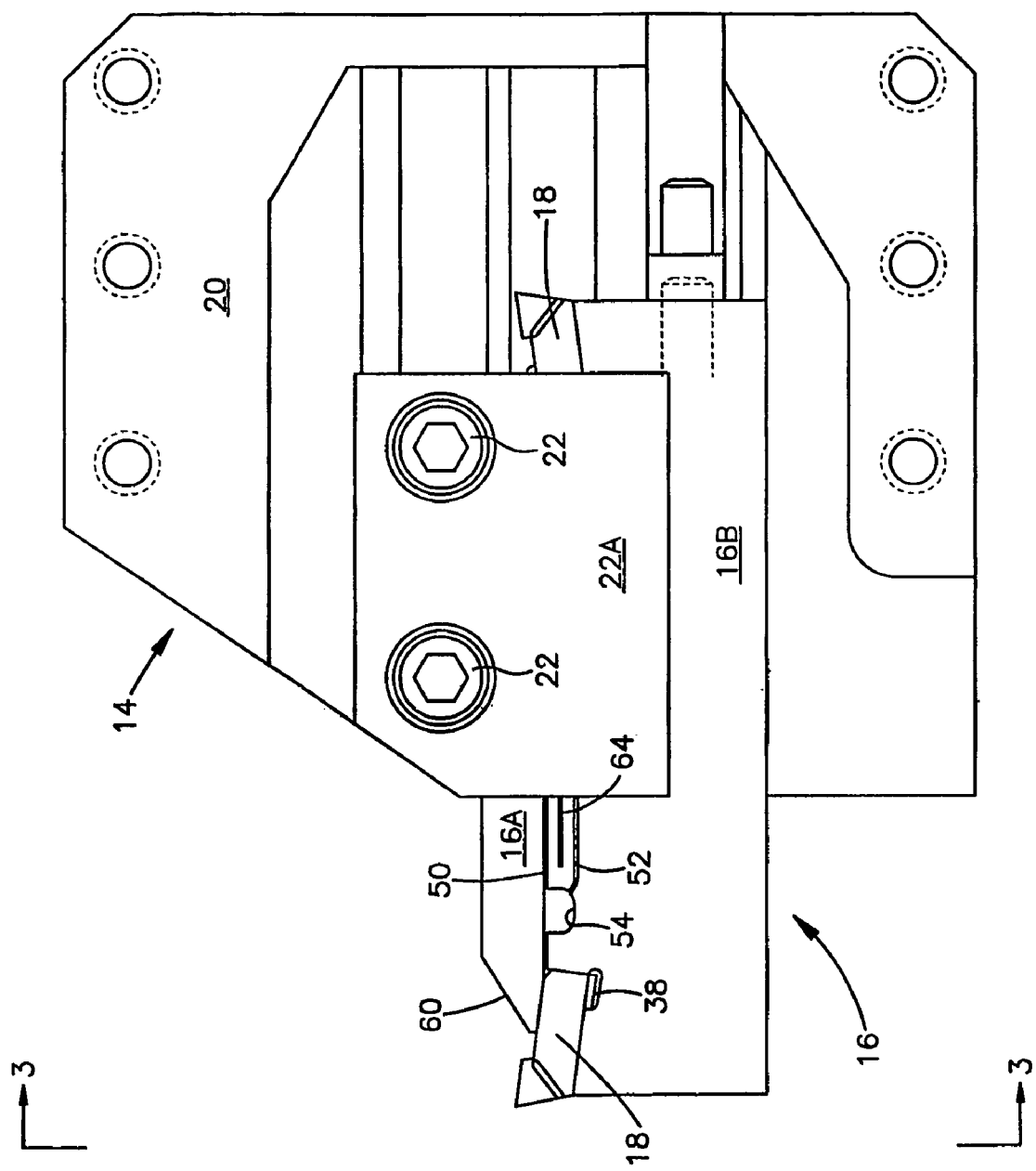
FIG. 2 is a side elevational view of the cutoff tool and holder assembly shown in FIG. 1.
Figure 3:
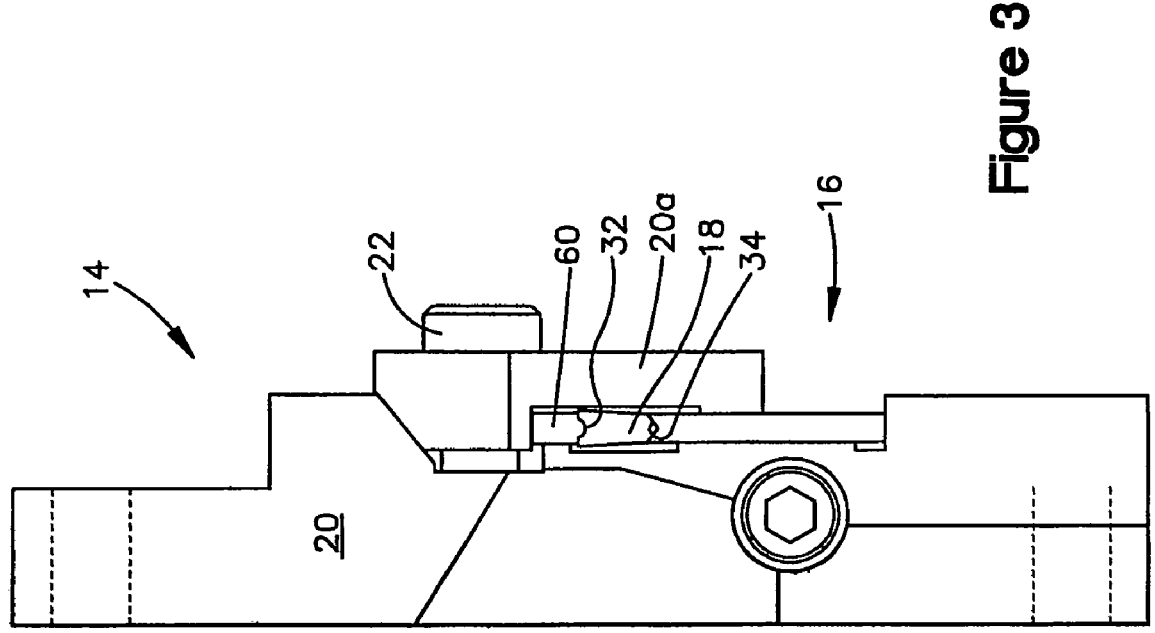
FIG. 3 is an end view as seen from the plane indicated by the line 3-3 in FIG. 2.

FIGS. 1-3 illustrate the overall construction of a cutoff tool 10 constructed in accordance with the preferred embodiment of the invention shown mounted in a conventional tool holder assembly 14. The cutoff tool 10 of the present invention includes a support/retaining blade 16 that is adapted to receive a replaceable cutting insert indicated generally by the reference character 18. The cutting insert 18 may comprise various configurations and include the type of cutting insert shown in U.S. Design Pat. No. 275,760 which is hereby incorporated by reference and is owned by the assignee of the present application. The tool holder assembly 14 which as indicated above may be of conventional design, includes a tool holder body 20 which includes structure by which the body is securely attached to a machine tool and a clamp 20a for rigidly securing the cutoff tool 10 to the tool holder body 20. A pair of threaded fasteners 22 secure the clamp 20a to the tool holder body 20 and in so doing, clamp the cutoff tool 10 to the holder assembly 14. In the illustrated embodiment, the extent to which the support/retaining blade 16 and hence the cutting insert 18 extends from the tool holder assembly 14 is adjustable.

Figure 4:
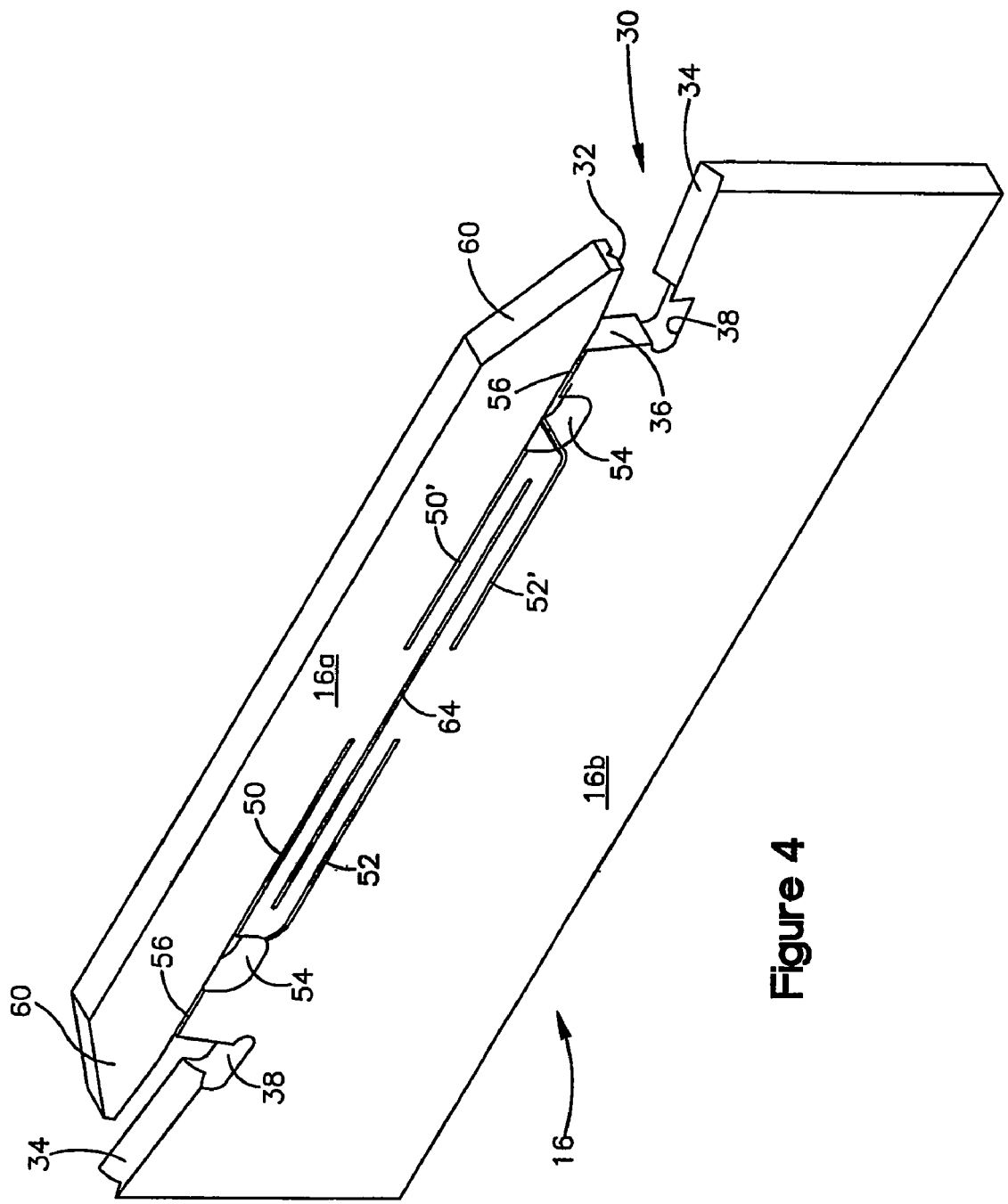
FIG. 4 is a perspective view of a support/retaining blade constructed in accordance with the preferred embodiment of the invention.
Figure 5:
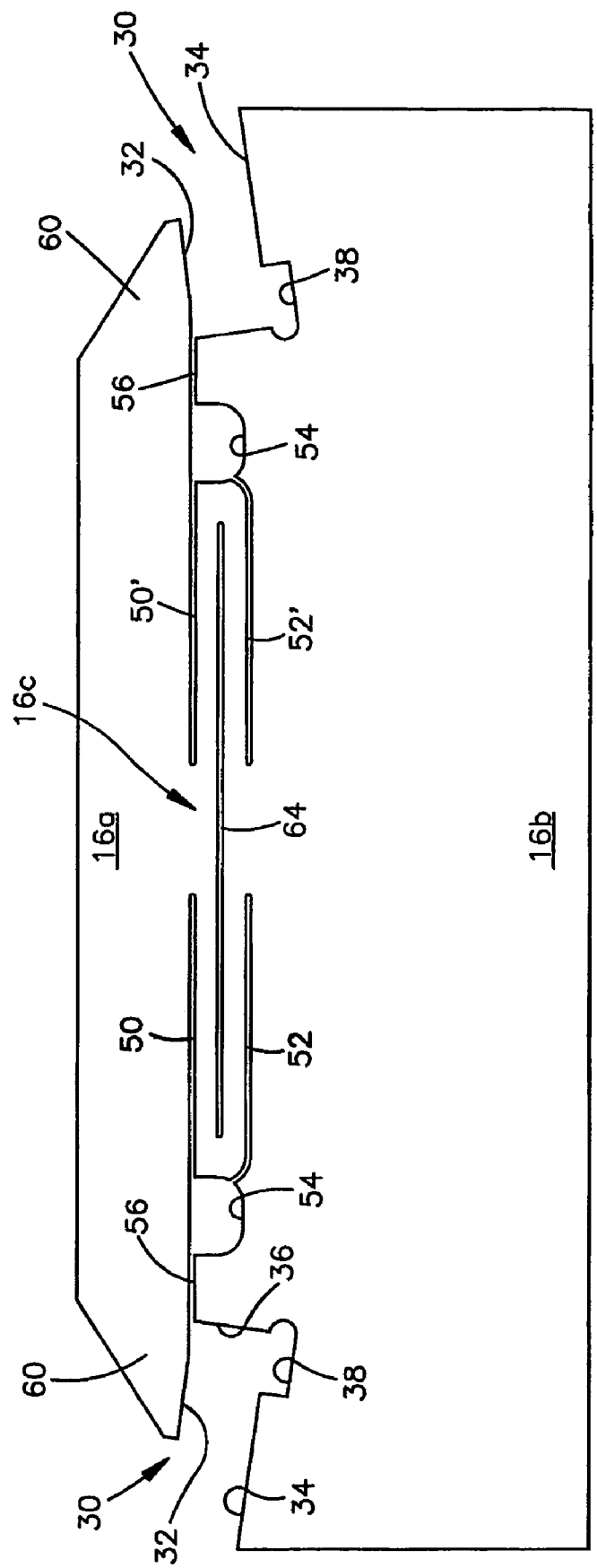
FIG. 5 is a side elevational view of the support/retaining blade.
Figure 6:
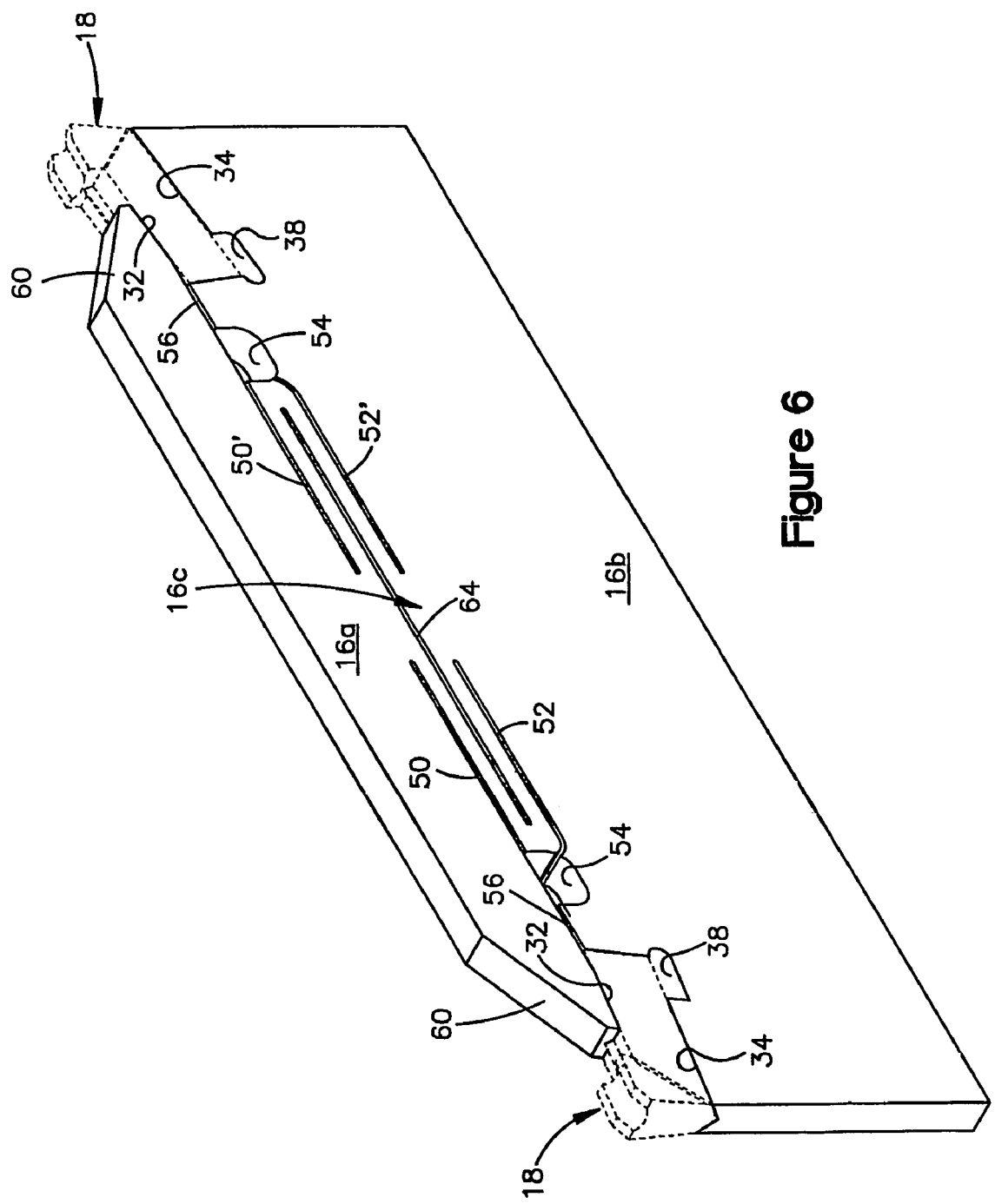
FIG. 6 is a perspective view of the support/retaining blade with a cutting insert installed.

Turning now to FIGS. 4-6, the construction of the support/retaining blade 16 is illustrated. Referring in particular to FIG. 5, the support/retaining blade is preferably formed from a single piece of material and defines at least one slot or pocket 30 adapted to receive the cutting insert 18. The slot 30 is defined by upper and lower insert gripping surfaces 32, 34 and an abutment or back wall 36. In the preferred and illustrated embodiment, a relieved or clearance portion 38 is defined between the lower gripping surface 34 and the abutment wall 36. This relieved portion 38 provides clearance for the lower right corner of the insert 18 (as viewed in FIG. 2) and assures precise, close fitting engagement between the cutting insert 18 and the gripping surfaces 32, 34 and the abutment wall 36 of the support/retaining blade 16. As seen best in FIG. 4, the lower gripping surface 34 may be "V" shaped and adapted to receive a complementally shaped "V" shaped lower surface defined by the cutting insert 18. In the preferred and illustrated embodiment, the cutting insert 18 includes a "V" shaped upper surface which is adapted to receive a "V" shaped, downwardly depending protrusion defined by the upper gripping surface 32 of the support/retaining blade 16. With the disclosed construction, the engagement of the "V" shaped gripping surfaces 32, 34 with the complementally shaped surfaces on the cutting insert 18 assure that the insert is securely gripped by the support/retaining blade 16; lateral or transverse relative movement between the cutting insert 18 and the support/retaining blade 16 (i.e. axial movement with respect to a rotating work piece—not shown) is substantially inhibited.

In the illustrated embodiment, an insert receiving slot 30 is defined on an opposite end of the support/retaining blade 16. In this preferred embodiment, a pair of cutting inserts 18 can be concurrently mounted in the support/retaining blade 16. When one insert is worn or requires replacement, the support/retaining blade 16 can simply be rotated 180 degrees in the tool holder assembly 14 so that a fresh cutting insert is presented in the machining position.

Referring again to FIG. 5, the upper "V" shaped gripping surface 32 forms part of a top clamping portion 16a of the support/retaining blade 16. The lower gripping surface 34 and the abutment wall 38 form part of a lower body portion 16b of the support/retaining blade 16. In accordance with the invention, the upper clamping portion 16a is coupled to the lower body portion 16b by an integrally formed resilient or semi-resilient support blade portion indicated generally by the reference character 16c. In accordance with the invention, the resilient coupling 16c between the upper clamping portion 16a and the body portion 16b of the support/retaining blade 16 enables the upper and lower gripping surfaces 32, 34 of the support/retaining blade 16 to be separated slightly with minimal force, to enable the cutting insert 18 to be installed into, or removed from, the slot 30. Unlike the prior art, special tools for exerting prying forces on the support/retaining blade 16 in order to provide some separation between the upper and lower gripping surfaces 32, 34 are not needed. The resilient coupling portion 16c enables a machine operator using only minimal hand force, to remove or replace a cutting insert 18 in the support/retaining blade 16.

In the preferred and illustrated embodiment, the coupling portion 16c includes a plurality of thin slots which are cut or burned through the support/retaining blade 16. In the illustrated embodiment, the slots are created using a known laser technology. As seen best in FIG. 5, a pair of upper and lower slots 50, 52 extend laterally from an aperture 54. A short slot segment 56 extends outwardly from the aperture 54, in order to provide a separation between an outboard end 60 of the clamp portion 16a and the body portion 16b of the support/retaining blade 16. The outboard portion 60 serves as a slightly moveable, upper insert clamping jaw. The slots 50, 52 extend laterally toward an intermediate or center section of the support retaining blade 16.

A pair of slots 50', 52' similar to the slots 50, 52 also extend from an aperture 54', towards the central portion of the support/retaining blade 16. An intermediate slot 64 is formed in the central portion of the support/retaining blade 16 and is located between the upper and lower slots 50, 52, 50', 52'.

The clearances provided by the thin slots allow slight, resilient movement between the upper clamping portion 16a of the support/retaining blade 16 and the lower body portion 16b. Relative movement between the upper and lower gripping surfaces 32, 34 can be achieved with minimal force, thereby allow cutting inserts 18 to be installed and replaced using hand force.

In accordance with the invention, the clamping member or bar 20a forming part of the tool holder assembly 14 not only clamps the support/retaining blade 16 to the tool holder body 20 but also exerts a clamping force on the cutting insert 18 held in the insert receiving slot 30 (or slots if the support/retaining blade 16 includes multiple slots). The resilient coupling region 16a of the support/retaining blade 16 (provided by the slots) permits the clamping portion 16a of the support/retaining blade and in particular, the clamping jaw 60, to move towards the body portion 16b when a clamping force is exerted on the support/retaining blade 16 by the clamping member 20a. This downward movement is manifested as a clamping force on the cutting insert 18 held in the insert receiving slot 30 (or slots). With the present invention, the clamping member 20a of the tool holder assembly 14 serves both as a means for clamping the support/retaining blade 16 to the tool holder body 20 but also as a cutting insert clamp for rigidly securing the cutting insert 18 to the support/retaining blade 16. The present invention eliminates the need for specialized tools for installing and removing the cutting insert 18 and/or components for clamping the cutting insert 18 to the support/retaining plate 16 that is separate and apart from the clamping components needed to clamp the support/retaining blade 16 to the tool holder assembly 14.

Although the invention has been described with a certain degree of particularity, it should be understood that those skilled in the art can make various changes to the invention without departing from the spirit or scope of the invention as here and after claimed.

I claim:

1. A cutting tool assembly, comprising:
   a) a tool holder including a clamp;
   b) a cutting insert support member removably held in said tool holder by said clamp;
   c) a cutting insert removably held by said insert support member;
   d) said insert support member defining an insert receiving pocket defined in part by a body portion and a clamping portion, the clamping portion coupled to said body portion by an integrally formed resilient portion which permits slight resilient movement between said clamping and body portions to facilitate the installation of a cutting insert in said pocket;
   e) said support member defining a slot segment that extends outwardly from an aperture, said aperture spaced inwardly with respect to said pocket; and f) said resilient portion including at least one relatively this slot and laterally extending slot extending inwardly from said aperture.

2. The apparatus of claim 1 wherein said resilient portion enables clamping forces exerted by said tool holder clamp to be transferred to the cutting insert held in said pocket.

3. The apparatus of claim 1 wherein said resilient portion includes a plurality of said relatively thin slots.

4. The apparatus of claim 1 wherein said body portion and said clamping portion each define gripping surfaces engagable with complementally formed surfaces on said cutting insert.

5. The apparatus of claim 4 wherein said gripping surfaces are V-shaped.

6. The apparatus of claim 1 wherein said cutting insert support member is in the form of a blade and said tool holder clamp is operative to apply clamping forces to said clamping portion of said blade, whereby said blade is held in said tool holder.

7. The apparatus of claim 6 wherein said blade defines an insert receiving pocket at opposite ends.

8. The apparatus of claim 7 wherein each pocket includes an abutment wall which is engaged by a cutting insert held in said pocket.

9. A cutting insert support blade adapted to be held in a tool holder, comprising:
   a) a body portion;
   b) a clamp portion;
   c) a resilient coupling region joining said clamp portion to said body portion;
   d) a pair of cutting insert receiving pockets defined between said body and clamping portions each pocket including a slot segment; and,
   e) said coupling region including a plurality of relatively thin slots formed in said coupling region located intermediate said slot segments.

10. The apparatus of claim 9 wherein said plurality of slots includes a pair of upper and lower slots associated with one of said insert receiving pockets and another pair of upper and lower slots associated with another of said insert receiving pockets.

11. The apparatus of claim 10 wherein said plurality of slots further includes a laterally extending slot positioned between said upper and lower slots.

12. A cutting tool assembly, comprising:
   a) a tool holder including a removable clamp;
   b) a cutting insert support blade removably held in said tool holder by said clamp;
   c) said insert support blade defining at least one insert receiving pocket defined in part by a body portion and a clamping portion coupled together by an integrally formed deformable portion which permits slight resilient movement between said clamping and body portions to facilitate the installation of a cutting insert in said pocket, said pocket communicating with an aperture;
   d) said body portion and said clamping portion including respective gripping surfaces movable towards and away from complementally formed surfaces on a cutting insert held in said pocket;
   e) said gripping surfaces urged into clamping engagement with said complementally formed insert surfaces by said tool holder clamp; and
   f) said deformable portion including a plurality of relatively thin slots spaced inwardly with respect to said aperture.

13. The apparatus of claim 12 wherein said integrally formed deformable portion includes at least one relatively thin slot located between said body portion and said clamping portion.

14. The apparatus of claim 12 wherein said body, clamping and deformable portions are integrally formed from a single piece of material.

15. The apparatus of claim 12 wherein said insert support blade defines two insert receiving pockets and said blade is reversible in said tool holder to present either one of two cutting inserts held by said pockets into a machining position.

16. A cutting insert support blade adapted to be held in a tool holder, comprising:
   a) a body portion;
   b) a clamp portion;
   c) a resilient coupling region joining said clamp portion to said body portion;
   d) a pair of cutting insert receiving pockets defined between said body and clamping portions;
   e) said coupling portion including a plurality of relatively thin slots formed in said coupling portion; and
   f) said plurality of slots includes a pair of upper and lower slots associated with one of said insert receiving pockets and another pair of upper and lower slots associated with another of said insert receiving pockets.

17. The apparatus of claim 16 wherein said plurality of slots further includes a laterally extending slot positioned between said upper and lower slots.

* * * * *